United States Patent
Cao et al.

(10) Patent No.: US 11,617,909 B2
(45) Date of Patent: Apr. 4, 2023

(54) METHOD FOR PREPARING NON-CORROSIVE FIRE EXTINGUISHING AGENT

(71) Applicants: Huazhong University of Science and Technology, Hubei (CN); ZHEJIANG LANDUN ELECTRICIAN NEW MATERIAL TECHNOLOGY CO., LTD., Zhejiang (CN)

(72) Inventors: Yuancheng Cao, Hubei (CN); Weixin Zhang, Hubei (CN); Shun Tang, Hubei (CN); Yunhui Zhong, Zhejiang (CN); Hao Wu, Zhejiang (CN)

(73) Assignees: Huazhong University of Science and Technology, Wuhan (CN); ZHEJIANG LANDUN ELECTRICIAN NEW MATERIAL TECHNOLOGY CO., LTD., Hangzhou (CN)

( * ) Notice: Subject to any disclaimer, the term of this patent is extended or adjusted under 35 U.S.C. 154(b) by 16 days.

(21) Appl. No.: 17/338,267

(22) Filed: Jun. 3, 2021

(65) Prior Publication Data
US 2022/0387837 A1 Dec. 8, 2022

(51) Int. Cl.
A62D 1/00 (2006.01)
A62D 1/02 (2006.01)

(52) U.S. Cl.
CPC ............ *A62D 1/0085* (2013.01); *A62D 1/005* (2013.01)

(58) Field of Classification Search
CPC ................................ A62D 1/005; A62D 1/085
See application file for complete search history.

(56) References Cited

U.S. PATENT DOCUMENTS 6,478,979 B1 * 11/2002 Rivers ................. A62D 1/0057
252/2
9,713,732 B2 * 7/2017 Mitchell ................... A62C 3/08

FOREIGN PATENT DOCUMENTS

| CN | 107910481 A | * | 4/2018 | ............ H01M 2/145 |
| --- | --- | --- | --- | --- |
| CN | 108054405 A | * | 5/2018 | |
| CN | 109054866 A | * | 12/2018 | |
| CN | 109568869 A | * | 4/2019 | |
| CN | 111686398 A | | 9/2020 | |
| CN | 112619022 A | * | 4/2021 | ............ A62D 1/0028 |
| CN | 112619022 A | | 4/2021 | |

OTHER PUBLICATIONS

Xiang et al. ("Dimethyl methylphosphonate (DMMP) as an efficient flame retardant additive for the lithium-ion battery electrolytes," Journal of Power Sources, 173, 2007, 562-564) (Year: 2007).*
Kang et al. ("Microfluidic fabrication of polysiloxane/dimethyl methylphosphonate flame-retardant microcapsule and its application in silicone foams," Polym. Adv. Technol., 2019, 30, 1269-1278) (Year: 2019).*
English language machine translation of CN 112619022 A (Year: 2021).*

* cited by examiner

*Primary Examiner* — Matthew R Diaz

(57) ABSTRACT

A method for preparing a non-corrosive fire extinguishing agent, including combining a methyl phosphate organosilane material and a perfluorohexanone to prepare the fire extinguishing agent.

19 Claims, 8 Drawing Sheets

Immersion in a solution of the
fire extinguishing agent
(compound fire extinguishing agent)
of this application for 4h Immersion in the ABE fire
extinguishing agent solution for 4h

METHOD FOR PREPARING NON-CORROSIVE FIRE EXTINGUISHING AGENT

TECHNICAL FIELD

This application relates to fire safety, and more particularly to a method for preparing a non-corrosive fire extinguishing agent.

BACKGROUND

Traditional fire extinguishing agents, such as fluorinated ketone fire extinguishing agents, will produce trace amounts of HF in the presence of water, which will seriously corrode the electronic components. Moreover, HF will also corrode storage tanks, pipelines, etc., affecting the reliability and service life of the fire protection system. Severely, the sealing rubber may be damaged, which will cause the leakage of fire extinguishing agents, thereby attenuating the effectiveness of the fire fighting system. Moreover, the leakage of fire extinguishing agents will also cause serious secondary damage, such as corrosion of electronic and electrical systems.

SUMMARY

To solve the above problem, this application provides a method for preparing a non-corrosive fire extinguishing agent.

Technical solutions are specifically described as follows.

In a first aspect, this application provides a method for preparing a fire extinguishing agent, comprising:

(1) dissolving polyethylene glycol and a silane coupling agent in an organic solvent followed by reaction in a first inert gas and filtration to obtain a first reaction product;

(2) mixing the first reaction product obtained in step (1) with a nano-silica hydrosol followed by reaction in a second inert gas and centrifugation to obtain a second reaction product;

(3) mixing the second reaction product obtained in step (2) with polypropylene glycol followed by reaction to obtain a third reaction product;

(4) mixing the third reaction product obtained in step (3) with dimethyl methylphosphonate followed by reaction to obtain a methyl phosphate organosilane gel fire extinguishing material;

(5) pouring the methyl phosphate organosilane gel fire extinguishing material obtained in step (4) on a mold followed by freeze-drying and crushing to obtain a granular fire extinguishing material; and (6) purifying the granular fire extinguishing material obtained in step (5) followed by mixing with perfluoro(2-methyl-3-pentanone) to obtain the fire extinguishing agent.

In some embodiments, in step (1), a weight ratio of the polyethylene glycol to the silane coupling agent is (5-6):1, preferably 5:1.

In some embodiments, in step (1), the organic solvent is a mixture of dimethyl formamide (DMF) and water in a weight ratio of 1:4.

In some embodiments, in step (1), the first inert gas is nitrogen.

In some embodiments, in step (1), the reaction is performed at 110-120° C. for 2-3 h, preferably at 120° C. for 2 h.

In some embodiments, in step (2), a weight ratio of the first reaction product to the nano-silica hydrosol is (10-20):1, preferably 15:1.

In some embodiments, in step (2), the second inert gas is nitrogen.

In some embodiments, in step (2), the reaction is performed at 40-50° C. for 2-3 h, preferably at 40° C. for 3 h.

In some embodiments, in step (3), a weight ratio of the second reaction product to polypropylene glycol is 1:(1-2), preferably 1:2.

In some embodiments, in step (3), the reaction is performed at 40-50° C. for 2-3 h, preferably at 40° C. for 3 h.

In some embodiments, in step (4), a weight ratio of the third reaction product to dimethyl methylphosphonate is (4-5):1, preferably 4:1.

In some embodiments, in step (4), the reaction is performed at 40-50° C. for 1-3 h, preferably at 40° C. for 3 h.

In some embodiments, in step (5), the mold is a polytetrafluoroethylene mold.

In some embodiments, in step (6), the perfluoro(2-methyl-3-pentanone) is Novec 1230.

In some embodiments, in step (6), a weight ratio of the granular fire extinguishing material to perfluoro(2-methyl-3-pentanone) is 1:(4-9), preferably 3:17.

In a second aspect, this application provides a fire extinguishing agent prepared by the above-mentioned method.

6B: immersion of the battery in a solution of the ABE fire extinguishing agent; 6C: submersion of the battery in the dry powder fire extinguishing agent;

6D: the corrosion of the surfaces of the positive and negative electrodes of the battery after being immersed in the solution of the fire extinguishing agent (compound fire extinguishing agent) prepared in Example 1 for 4 h; 6E: the corrosion of the surfaces of the positive and negative electrodes of the battery after being immersed in the solution of the ABE fire extinguishing agent for 4 h; and 6F: the corrosion of the surfaces of the positive and negative electrodes of the battery after being submersed in the dry powder fire extinguishing agent for 4 h.

Figure 7A:
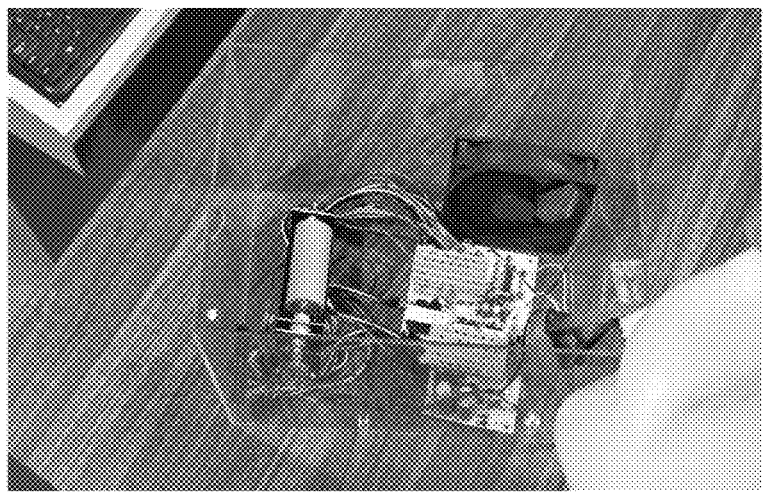
Figure 7B:
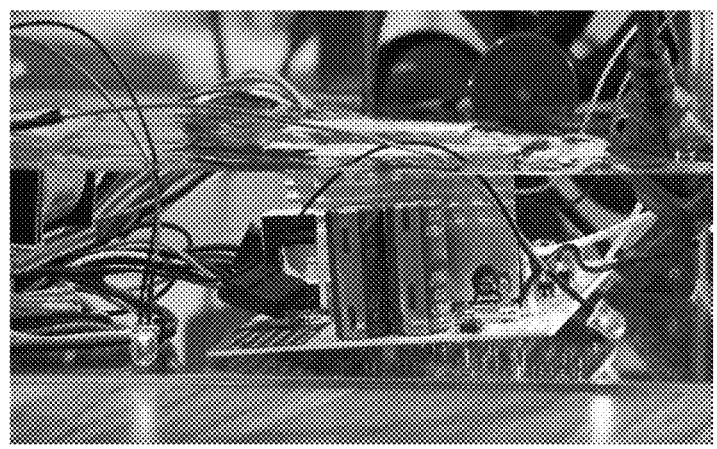

FIGS. 7A-7B shows an influence of the fire extinguishing agent prepared in Example 1 on a circuit of electronic components; where A: a picture of the electronic components; and B: the circuit operation of the electronic components.

DETAILED DESCRIPTION OF EMBODIMENTS

In order to render the objects, technical solutions and beneficial effects of the disclosure clearer, the disclosure will be described below in detail in conjunction with embodiments.

Example 1

This embodiment provided a method for preparing a non-corrosive fire extinguishing agent, which was specifically described as follows.

(1) Polyethylene glycol and silane coupling agent in a weight ratio of 5:1 were dissolved in a mixture of DMF and water in a weight ratio of 1:4, reacted at 120° C. for 2 h under nitrogen protection and filtrated to obtain a first reaction product.

(2) The first reaction product obtained in step (1) and a nano-silica hydrosol were mixed in a weight ratio of 15:1, reacted at 40° C. for 3 h under nitrogen protection and centrifuged to obtain a second reaction product.

(3) The second product obtained in step (2) and polypropylene glycol were mixed in a weight ratio of 1:2 and reacted at 40° C. for 3 h to obtain a third reaction product, namely a polyethylene oxide (PEO)-based fire extinguishing additive.

(4) The third reaction product obtained in step (3) and dimethyl methylphosphonate were mixed in a weight ratio of 4:1, stirred uniformly and reacted at 40° C. for 3 h to obtain a methyl phosphate organosilane gel fire extinguishing material.

(5) The methyl phosphate organosilane gel fire extinguishing material obtained in step (4) were poured on a polytetrafluoroethylene mold, freeze-dried and crushed to obtain a granular fire extinguishing material.

(6) The granular fire extinguishing material obtained in step (5) was purified and mixed with perfluoro(2-methyl-3-pentanone) (Novec 1230) in a weight ratio of 15:85 to obtain the non-corrosive fire extinguishing agent.

Example 2

This embodiment provided a method for preparing a non-corrosive fire extinguishing agent, which was specifically described as follows.

(1) Polyethylene glycol and silane coupling agent in a weight ratio of 5:1 were dissolved in a mixture of DMF and water in a weight ratio of 1:4, reacted at 120° C. for 2 h under nitrogen protection and filtrated to obtain a first reaction product.

(2) The first reaction product obtained in step (1) and a nano-silica hydrosol were mixed in a weight ratio of 15:1, reacted at 40° C. for 3 h under nitrogen protection and centrifuged to obtain a second reaction product.

(3) The second product obtained in step (2) and polypropylene glycol were mixed in a weight ratio of 1:2 and reacted at 40° C. for 3 h to obtain a third reaction product, namely a polyethylene oxide (PEO)-based fire extinguishing additive.

(4) The third reaction product obtained in step (3) and dimethyl methylphosphonate were mixed in a weight ratio of 4:1, stirred uniformly and reacted at 40° C. for 3 h to obtain a methyl phosphate organosilane gel fire extinguishing material.

(5) The methyl phosphate organosilane gel fire extinguishing material obtained in step (4) were poured on a polytetrafluoroethylene mold, by freeze dried and crushed to obtain a granular fire extinguishing material.

(6) The granular fire extinguishing material obtained in step (5) was purified and mixed with perfluoro(2-methyl-3-pentanone) (Novec 1230) in a weight ratio of 10:90 to obtain the non-corrosive fire extinguishing agent.

Example 3

This embodiment provided a method for preparing a non-corrosive fire extinguishing agent, which was specifically described as follows.

(1) Polyethylene glycol and silane coupling agent in a weight ratio of 5:1 were dissolved in a mixture of DMF and water in a weight ratio of DMF to water was 1:4, reacted at 120° C. for 2 h under nitrogen protection and filtrated to obtain a first reaction product.

(2) The first reaction product obtained in step (1) and a nano-silica hydrosol were mixed in a weight ratio of 15:1, reacted at 40° C. for 3 h under nitrogen protection and centrifuged to obtain a second reaction product.

(3) The second product obtained in step (2) and polypropylene glycol were mixed in a weight ratio of 1:2 and reacted at 40° C. for 3 h to obtain a third reaction product, namely a polyethylene oxide (PEO)-based fire extinguishing additive.

(4) The third reaction product obtained in step (3) and dimethyl methylphosphonate were mixed in a weight ratio of 4:1, stirred uniformly and reacted at 40° C. for 3 h to obtain a methyl phosphate organosilane gel fire extinguishing material.

(5) The methyl phosphate organosilane gel fire extinguishing material obtained in step (4) were poured on a polytetrafluoroethylene mold, freeze dried and crushed to obtain a granular fire extinguishing material.

(6) The granular fire extinguishing material obtained in step (5) was purified and mixed with perfluoro(2-methyl-3-pentanone) (Novec 1230) in a weight ratio of 20:80 to obtain the non-corrosive fire extinguishing agent.

Example 4

Figure 1A:
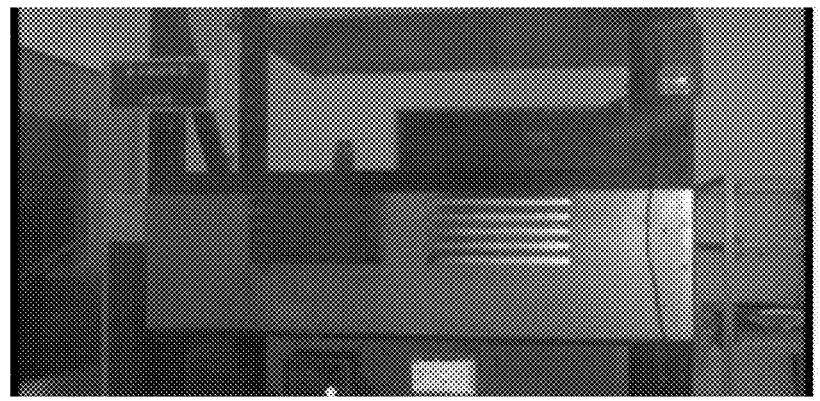
FIGS. 1A-1C shows a lithium battery fire-fighting test platform and test results; where 1A: a picture of a battery module before thermal runaway; 1B: spraying of a fire extinguishing agent on single cell in an early stage of the thermal runaway; and 1C: spraying of the fire extinguishing agent on the single cell in a later stage of the thermal runaway (after the open flame of the lithium battery is extinguished, the fire extinguishing agent is released again when the temperature rises to the threshold again).
Figure 1B:
Figure 1C:

The non-corrosive fire extinguishing agents prepared in Examples 1-3 of this application were tested for fire extinguishing performance on a charged lithium-ion battery, and the Novec 1230 was used as a control group. The fire extinguishing performance of the fire extinguishing agents were shown in Table 1 and FIGS. 1A-1B.

TABLE 1

Results of fire extinguishing test

| Group | Novec 1230 (parts by weight) | Granular fire extinguishing material (parts by weight) | Fire-extinguishing time (s) |
| --- | --- | --- | --- |
| Example 1 | 85 | 15 | 10 |
| Example 2 | 90 | 10 | 13 |
| Example 3 | 80 | 20 | 17 |
| Control group | 100 | 0 | 20 |

It can be seen from the data in Table 1 that the fire extinguishing agents prepared in Examples 1-3 can extinguish the open flame in a shorter time.

Example 5

The cooling effect of the non-corrosive fire extinguishing agent prepared in Example 1 on the battery module was tested.

Figure 2:
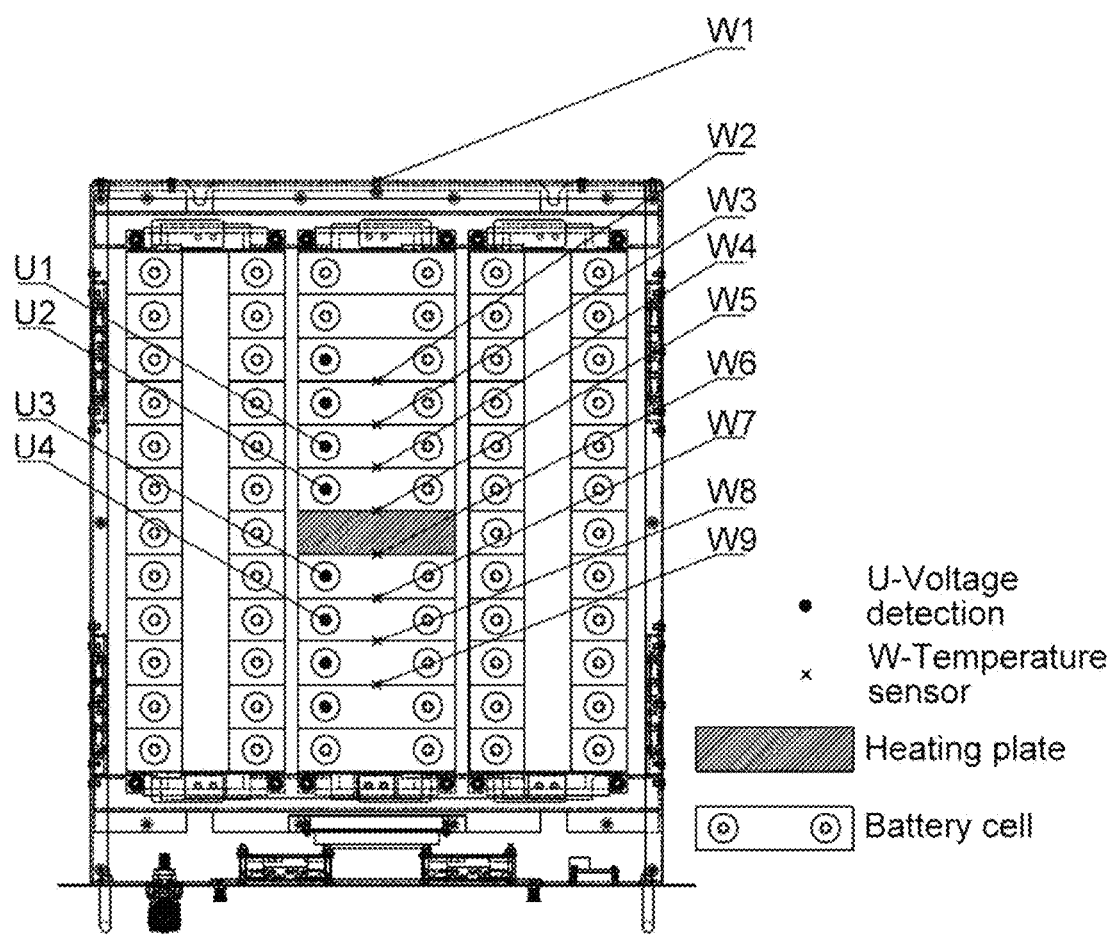
FIG. 2 schematically shows layout of lithium battery modules and thermocouples.
Figure 3:
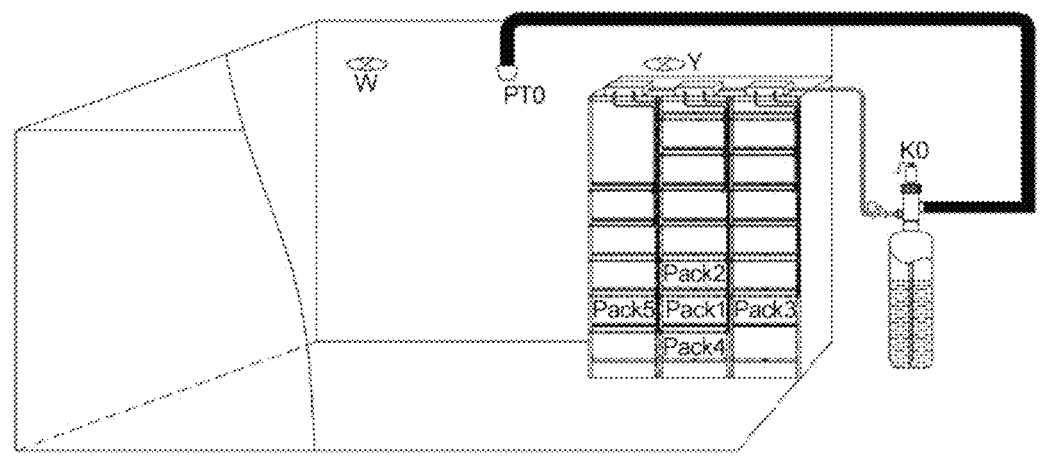
FIG. 3 schematically shows installation of a fire extinguishing device.

As shown in FIG. 2, a volume of the fire extinguishing and cooling test space for a lithium battery module was 1040 mm×600 mm×300 mm, and parameters of the lithium battery module were listed as follows: specification of single cell: 32650 lithium iron phosphate (LiFePO$_4$) battery; battery module: 2P8S (24V, 12 Ah); size of the battery module: 132 mm×130 mm×71 mm; and size of the battery box shell: 154 mm×154 mm×146 mm (tolerance: ±10%). A power of the heating plate was 200-500 W. The fire extinguisher bottle set was placed at 20±3° C. for 16 h, where a filling weight of the inhibitor (fire extinguishing agent) was 5.20 kg, and a filling pressure was 2.5 MPa. The fire extinguishing device was installed according to the design shown in FIG. 3.

Figure 4:
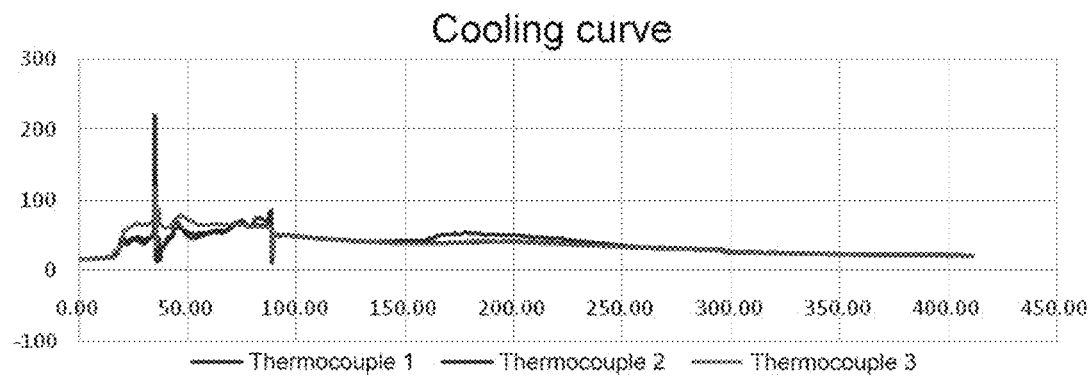
FIG. 4 shows a cooling effect of a fire extinguishing agent prepared in Example 1 on a 32650 battery module (2P8S).
Figure 5:
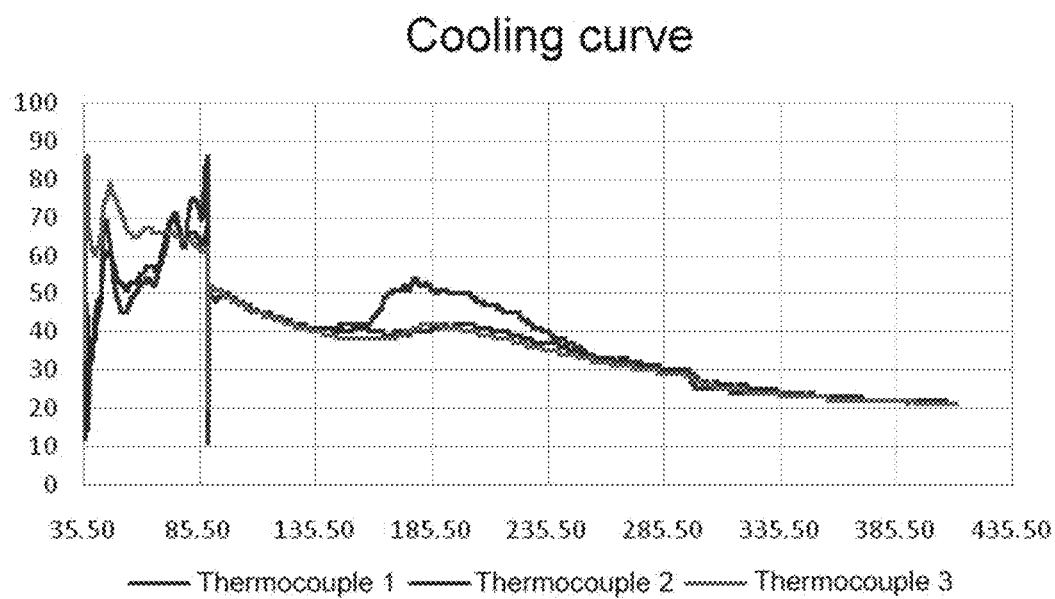
FIG. 5 shows a cooling effect of heptafluoropropane fire extinguishing agent on a 32650 battery module (2P8S).

The cooling effects of the fire extinguishing agent prepared in Example 1 and the heptafluoropropane fire extinguishing agent on the 32650 battery module (2P8S) were compared under the same dose and test conditions, and the results were shown in FIGS. 4 and 5. Under the same dose, the heptafluoropropane fire extinguishing agent exhibited a relatively poor cooling effect, and the lithium battery was prone to re-ignition. The fire extinguishing agent prepared in Example 1 had a better cooling effect and can effectively prevent the re-ignition of the lithium battery.

Example 6

The corrosion of the non-corrosive fire extinguishing agent prepared in Example 1 on the battery was tested as follows.

The 32650 lithium batteries were completely immersed in a solution of the fire extinguishing agent prepared in Example 1 and a solution of the ABE fire extinguishing agent, and submerged in the dry powder fire extinguishing agent for 4 h, respectively, and the corrosion of surfaces of the positive electrode and negative electrode of the battery was observed (as shown in FIG. 6). The battery was subject to voltage test, and the results were shown in Table 2. The ABE fire extinguishing agent refers to fire extinguishing agents suitable for Class A, B, and E fires, such as water-based fire extinguishing agents and foam fire extinguishing agents.

TABLE 2

Results of voltage test of batteries

| Items extinguishing agent | | Fire extinguishing agent prepared in Example 1 | ABE fire extinguishing agent | Dry powder fire extinguishing agent |
|---|---|---|---|---|
| Voltage | 0 h | 3.46 V | 3.46 V | 3.45 V |
|  | 4 h | 3.46 V | 3.45 V | 3.45 V |
|  | 20 h | 3.46 V | 3.99 V | 3.45 V |
|  | 24 h | 3.46 V | 3.98 V | 3.45 V |
|  | 36 h | 3.45 V | 3.98 V | 3.45 V |

It can be seen from FIGS. 6A-6F and Table 2 that after immersed in the fire extinguishing agent prepared in Example 1 for a long time, the performance of the lithium battery (32650) was basically not affected. The performance of the lithium battery (32650) was almost not affected when immersed in the solution of the ABE fire extinguishing agent for a short time, but as the immersion time prolonged, the lithium battery was significantly corroded by the ABE fire extinguishing agent and parts of the positive electrode and negative electrode will fall off, and thus the lithium batteries cannot be kept in good condition.

Figure 6A:
FIGS. 6A-6F depict corrosion of the fire extinguishing agent prepared in Example 1, an ABE fire extinguishing agent and a dry powder fire extinguishing agent on surfaces of positive and negative electrodes of the battery, where 6A: immersion of the battery in a solution of the fire extinguishing agent (compound fire extinguishing agent) prepared in Example 1.
Figure 6B:
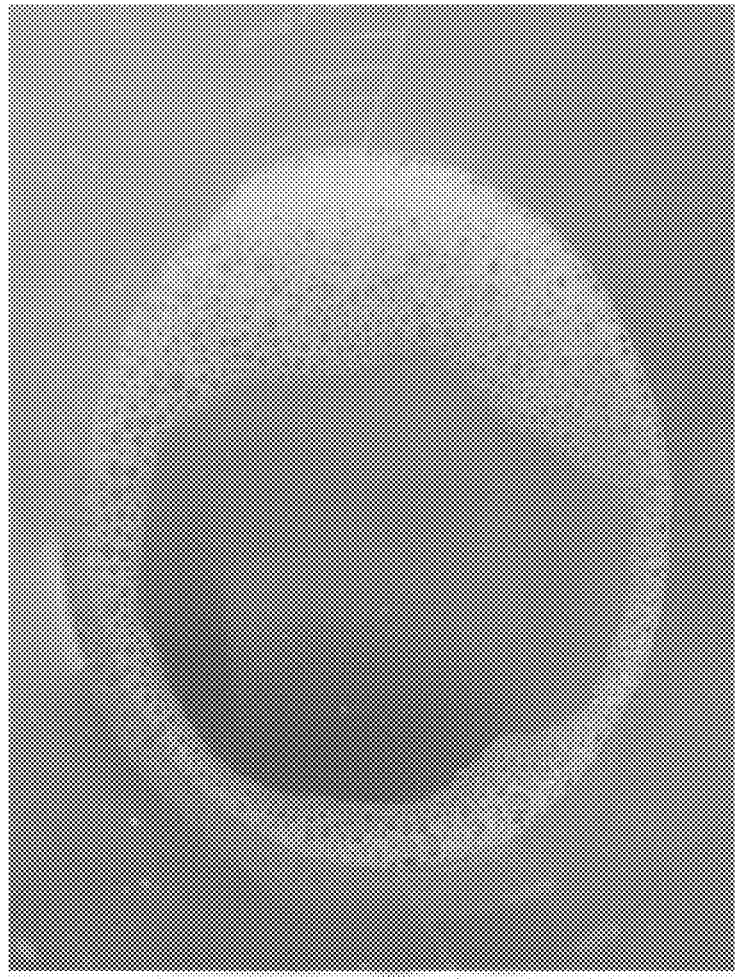
Figure 6C:
Figure 6D:
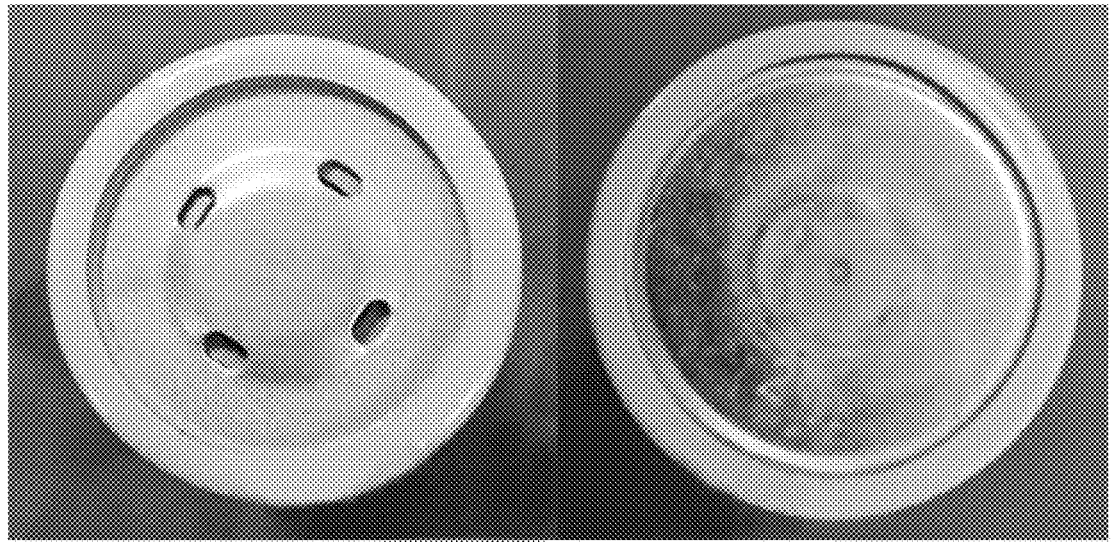
Figure 6E:
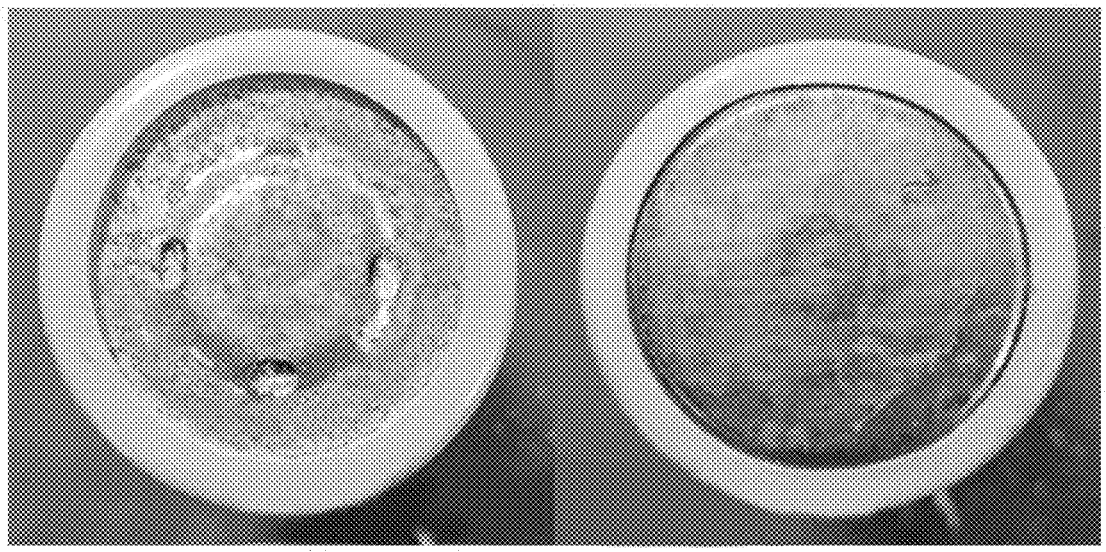
Figure 6F:
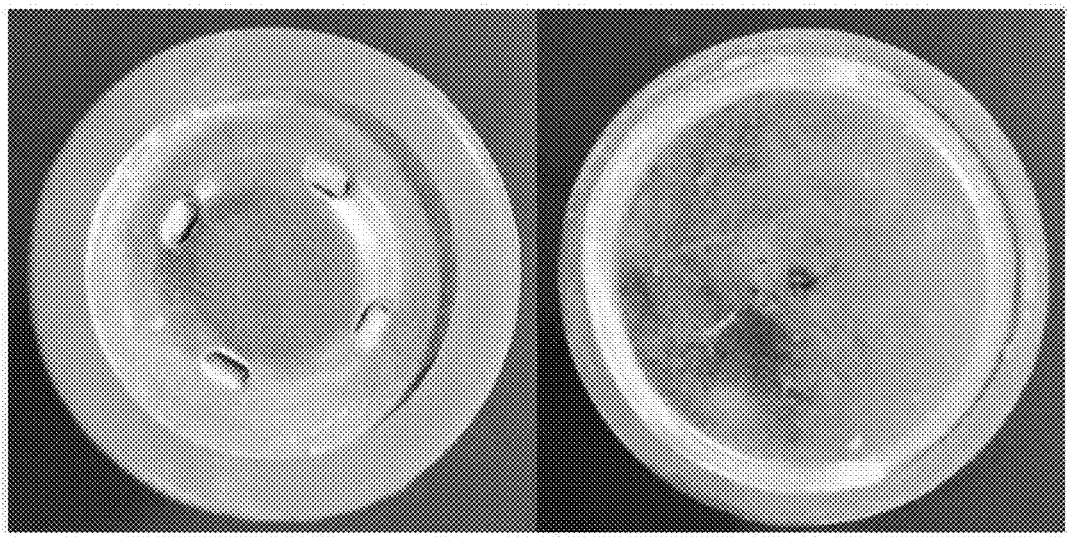

No significant alteration was observed in the performance of the lithium battery after submerged in the dry powder fire extinguishing agent for a long time, but the dry powder fire extinguishing agent will enter the gap of the positive and negative electrodes of the lithium battery and cannot be effectively removed (FIG. 6F).

Example 7

The influence of the fire extinguishing agent prepared in Example 1 on the circuit of electronic components was tested. The electronic components (including power supply, electronic circuit boards, terminal blocks, and fans) were assembled into a simple circuit model and put into a transparent plastic container with a volume of 50*50*50 cm. After the power was on, the indicator light was on and the fan was rotated. The solution of the fire extinguishing agent prepared in Example 1 was slowly poured into the container, and it can be found that the circuit was still under normal operation without a short circuit (FIG. 7), that is, the brightness of the indicator light and the speed of the fan did not change.

In this application, a substance that can slowly react with water to eliminate molecular water was introduced to prepare a non-corrosive fire extinguishing agent. The inert organosiloxane was used as a trace additive, and the chain segment of the organosilane polymer was broken at high temperature to produce Si—O free radicals, which can capture H free radicals and OH free radicals in high-temperature vapors to form stable carbide on the surface of the polymer materials, so that the material was isolated from oxygen and moisture, exhibiting a flame-retardant and corrosion-resistant effect. As a consequence, the lithium battery and electronic components thereof will not be damaged after contacting with the fire extinguishing agent, and the fire extinguishing agent added with the additive has good safety, and will not cause short circuit. The fire extinguishing material containing the additive had brilliant application prospect and huge economic value.

The methyl phosphate organosilane fire extinguishing material prepared in this application can form stable carbide on the surface of the polymer material to isolate the material from oxygen and moisture, playing a role of flame retardant and water blocking and exhibiting good safety.

In this application, the methylphosphonic acid organosilane and the perfluoro(2-methyl-3-pentanone) are combined to act as a novel fire extinguishing material, which can be used for extinguishing fires of lithium-ion batteries, transformer substations, inflammable chemicals, large-scale buildings, coal mines, forests, vehicles and the like, especially for extinguishing electrical fires.

The above embodiments are merely illustrative of the disclosure, and are not intended to limit the disclosure. Any changes, modifications and improvements made by those skilled in the art without departing from the spirit of the present disclosure shall fall within the scope of the present disclosure.

What is claimed is:

1. A method for preparing a fire extinguishing agent, comprising:

(1) dissolving polyethylene glycol and a silane coupling agent in a solvent followed by reaction in a first inert gas and filtration to obtain a first reaction product;
(2) mixing the first reaction product obtained in step (1) with a nano-silica hydrosol followed by reaction in a second inert gas and centrifugation to obtain a second reaction product;
(3) mixing the second reaction product obtained in step (2) with polypropylene glycol followed by reaction to obtain a third reaction product;
(4) mixing the third reaction product obtained in step (3) with dimethyl methylphosphonate followed by reaction to obtain a methyl phosphate organosilane gel fire extinguishing material;
(5) pouring the methyl phosphate organosilane gel fire extinguishing material obtained in step (4) on a mold followed by freeze-drying and crushing to obtain a granular fire extinguishing material; and
(6) purifying the granular fire extinguishing material obtained in step (5) followed by mixing with perfluoro (2-methyl-3-pentanone) to obtain the fire extinguishing agent.

2. The method of claim 1, wherein in step (1), a weight ratio of the polyethylene glycol to the silane coupling agent is 5:1.

3. The method of claim 1, wherein in step (1), the solvent is a mixture of dimethyl formamide (DMF) and water.

4. The method of claim 3, wherein a weight ratio of DMF to water is 1:4.

5. The method of claim 1, wherein in step (1), the first inert gas is nitrogen.

6. The method of claim 1, wherein in step (1), the reaction is performed at 110-120° C. for 2-3 h.

7. The method of claim 1, wherein in step (2), a weight ratio of the first reaction product to the nano-silica hydrosol is 10-20:1.

8. The method of claim 1, wherein in step (2), a weight ratio of the first reaction product to the nano-silica hydrosol is 15:1.

9. The method of claim 1, wherein in step (2), the second inert gas is nitrogen.

10. The method of claim 1, wherein in step (2), the reaction is performed at 40-50° C. for 2-3 h.

11. The method of claim 1, wherein in step (3), a weight ratio of the second reaction product to polypropylene glycol is 1:1-2.

12. The method of claim 1, wherein in step (3), the reaction is performed at 40-50° C. for 2-3 h.

13. The method of claim 1, wherein in step (4), a weight ratio of the third reaction product to dimethyl methylphosphonate is 4-5:1.

14. The method of claim 1, wherein in step (4), a weight ratio of the third reaction product to dimethyl methylphosphonate is 4:1.

15. The method of claim 1, wherein in step (4), the reaction is performed at 40-50° C. for 1-3 h.

16. The method of claim 1, wherein in step (5), the mold is a polytetrafluoroethylene mold.

17. The method of claim 1, wherein in step (6), a weight ratio of the granular fire extinguishing material to perfluoro (2-methyl-3-pentanone) is 1:4-9.

18. The method of claim 1, wherein in step (6), a weight ratio of the granular fire extinguishing material to perfluoro (2-methyl-3-pentanone) is 3:17.

19. A fire extinguishing agent prepared by the method of claim 1.

* * * * *